C. L. HOFWOLT.
DRAFT EVENER ATTACHMENT.
APPLICATION FILED MAR. 25, 1909.
950,046.
Patented Feb. 22, 1910.
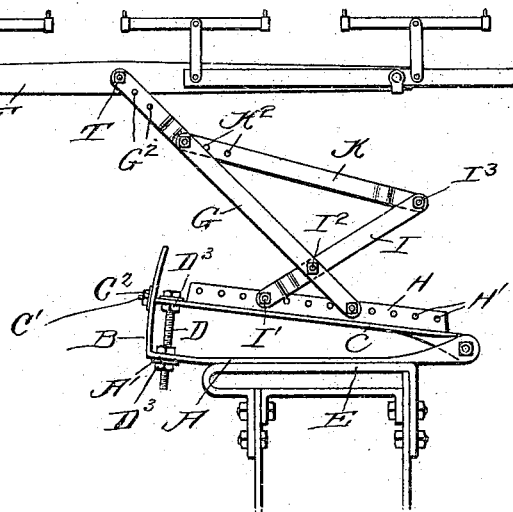
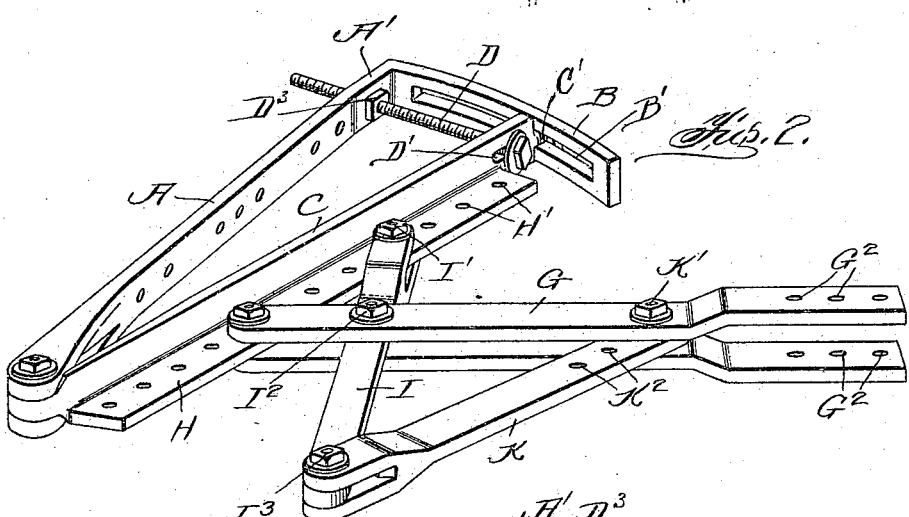
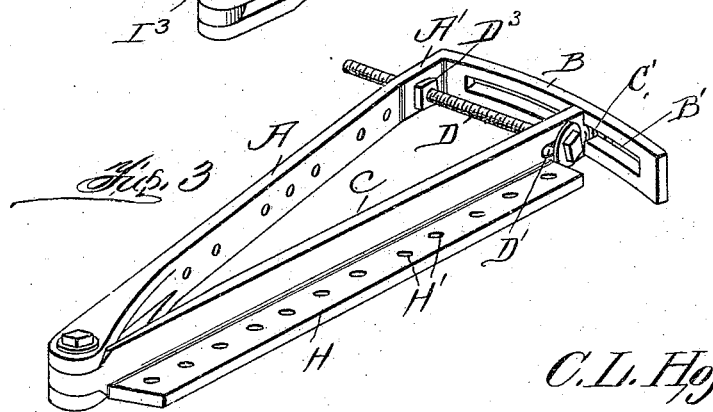

UNITED STATES PATENT OFFICE.

CHARLES L. HOFWOLT, OF SALEM, SOUTH DAKOTA.

DRAFT-EVENER ATTACHMENT.

950,046. Specification of Letters Patent. Patented Feb. 22, 1910.

Application filed March 25, 1909. Serial No. 485,806.

*To all whom it may concern:*

Be it known that I, CHARLES L. HOFWOLT, a citizen of the United States, residing in Salem, in the county of McCook and State of South Dakota, have invented a new and useful Improvement in a Draft-Evener Attachment, of which the following is a specification.

This invention relates generally to draft eveners, and more particularly to an attachment to be used between the gang plow and draft evener for the purpose of compensating for the side draft and permitting the plows to travel in lines parallel with the line of draft.

Another object is to provide an attachment which can be used in connection with various forms of gang plows, and also various forms of draft eveners and equalizing devices, and a still further object is to provide a device which shall be simple in construction, durable and efficient in operation, and one in which all the necessary adjustments can be quickly and easily made.

With these various objects in view, my invention consists in the novel features of construction, and combination or arrangement of parts, all of which will be fully described hereinafter, and pointed out in the claims.

In the drawing forming a part of this specification: Figure 1 is a top plan view of the device applied to a five-horse draft evener. Fig. 2 is a detail perspective view of my improvement, detached from the draft evener, and gang plow, and Fig. 3 is a detail perspective view of the essential feature of my invention, removed from the gang-plow, and also from the connecting links or rods.

In carrying out my invention, I employ a metal bar A which is preferably about two feet long, two inches wide, and one-half inch thick, but it will of course be understood that this attachment can be made of any size desired. At one end this bar is provided with a curved arc B slotted longitudinally as shown, and pivotally connected to the opposite end of the bar A, is a bar C which I designate the clevis bar, and which has its distal end reduced, as shown at C', in order to work in the slot B', and a nut $C^2$ is screwed upon this threaded reduced end for the purpose of holding the clevis bar C in its adjusted position, and in order to adjust the clevis bar with reference to the bar A, I employ a bolt D which bolt passes through an elongated opening D' in the clevis bar C, and through a threaded opening in the bar A, and nuts $D^3$ are arranged upon this bolt upon opposite sides of both bars for the purpose of relieving the threads of strain. The bar A is bolted to the clevis or frame E, of the gang plow, and by turning the bolt D, the clevis bar C can be adjusted to any desired angle.

F indicates a five-horse evener which is pivoted at its center to the forward end of a double link bar G, the opposite end of said double link bar being connected to the flange H formed integral with the clevis bar C, and having a series of apertures H' to receive the fastening bolt, by means of which the double link bar G is connected to the clevis bar.

I indicates a short cross-link bar connected at I' to the clevis bar, and at $I^2$ to the double cross bar, and at its outer end $I^3$, it is connected to the rear end of the short link bar K, the forward end of said short link bar being connected to the double link bar G, said link bar K having a plurality of apertures $K^2$ for the purpose of adjustment, and the double link bars G are also provided with apertures $G^2$ for adjustment, a bolt $K^1$ passing through said link bars.

In operation my improved device which is shown in detail in Fig. 3 is fastened to the clevis frame of a gang plow, and the link mechanism connected thereto for the purpose of connecting the five-horse draft-evener with the plow, and have the central line of draft off to one side, as shown, and by the proper adjustment of the link connections, and also the proper adjustment of the clevis bar C, with reference to the bar A, the side draft of the plow which would ordinarily throw the plow around to one side is corrected, and the plows are made to travel in perfectly straight lines, parallel with the central line of draft, and whenever any adjustment of the link mechanism is required, it can be quickly and easily accomplished by removing and replacing the bolts, and when any adjustment of my attachment is desired, it can be easily accomplished by adjusting the bolt D and nuts $D^3$, the slotted arc serving as a guide to steady the said parts during adjustment and afterward. In practice I prefer to give the end of the bar A a slight bend or upset, as shown at A', so that the nuts D² can rest firmly against this portion of the bar.

It will thus be seen that I provide an exceedingly simple durable and efficient attachment for five-horse draft eveners, whereby the plows are made to travel perfectly true.

Having thus fully described my invention, what I claim as new and desire to secure by Letters Patent is:—

1. An attachment of the kind described comprising a bar adapted to be attached to the clevis frame of a gang plow, and having a slotted arc at one end, a clevis bar pivotally connected to the first mentioned bar, and means for adjusting and securing said clevis bar, and an adjustable link mechanism for connecting the clevis bar with a draft evener.

2. An attachment of the kind described comprising a bar having a slotted arc, a pivoted clevis bar having an apertured flange, means for adjusting and securing the said clevis bar, link bars connected to said clevis bar, and to each other, substantially as described.

3. An attachment of the kind described, comprising a bar having a slotted arc, a clevis bar pivoted to said first mentioned bar, and having its distal end reduced and threaded and adapted to work in the slotted arc, a bolt passing through said bars, for the purpose of adjusting and securing the clevis bar at the proper angle with relation to the first mentioned bar, said clevis bar having an apertured flange integral with said clevis bar, substantially as, and for the purpose specified.

CHARLES L. HOFWOLT.

Witnesses:
CHAS. E. BROCK,
E. B. McBATH.